United States Patent
Ando

(10) Patent No.: US 9,174,346 B2
(45) Date of Patent: Nov. 3, 2015

(54) LOADING/UNLOADING ROBOT

(71) Applicant: HIRATA CORPORATION, Shinagawa-ku (JP)

(72) Inventor: Hiroaki Ando, Shinagawa-ku (JP)

(73) Assignee: HIRATA CORPORATION, Shinagawa-Ku, Tokyo (JP)

(*) Notice: Subject to any disclaimer, the term of this patent is extended or adjusted under 35 U.S.C. 154(b) by 0 days.

(21) Appl. No.: 14/046,485

(22) Filed: Oct. 4, 2013

(65) Prior Publication Data

US 2014/0099180 A1   Apr. 10, 2014

(30) Foreign Application Priority Data

Oct. 4, 2012 (JP) ................................ 2012-222551

(51) Int. Cl.
*B25J 9/04* (2006.01)
*B25J 18/04* (2006.01)
*B25J 11/00* (2006.01)

(52) U.S. Cl.
CPC *B25J 18/04* (2013.01); *B25J 9/043* (2013.01); *B25J 11/0095* (2013.01)

(58) Field of Classification Search
CPC .............. B25J 9/06; B25J 9/041; B25J 9/042; B25J 9/043; H01L 21/677; H01L 21/67742; H01L 21/67748
USPC ............. 414/217, 744.1–744.7, 749.1, 751.1, 414/806, 935, 937, 939; 901/14, 15, 17
See application file for complete search history.

(56) References Cited

U.S. PATENT DOCUMENTS

| | | | |
|---|---|---|---|
| 4,585,387 A * | 4/1986 | Jayne | 414/730 |
| 6,297,611 B1 | 10/2001 | Todorov et al. | |
| 2010/0278623 A1* | 11/2010 | Blank et al. | 414/749.1 |

FOREIGN PATENT DOCUMENTS

| | | |
|---|---|---|
| CN | 1405839 A | 3/2003 |
| CN | 101318325 A | 12/2008 |
| JP | H08-172121 A | 7/1996 |
| JP | H11-300659 A | 11/1999 |
| JP | 2000-077499 A | 3/2000 |
| JP | 2010-082742 A | 4/2010 |
| JP | 2012186389 A | 9/2012 |

OTHER PUBLICATIONS

Chinese Office Action dated Sep. 29, 2013 issued in the corresponding Chinese Patent Application No. 201310455928.4 (1 page).
European Search Report dated Oct. 13, 2014 issued in the corresponding European Patent Application No. 13187347.3-1712 (3 pages).

* cited by examiner

*Primary Examiner* — Saul Rodriguez
*Assistant Examiner* — Ronald Jarrett
(74) *Attorney, Agent, or Firm* — Buchanan Ingersoll & Rooney PC

(57) ABSTRACT

A loading/unloading robot includes an arm unit attached to a support unit that is capable of being raised and lowered and a hand unit for conveying a loaded/unloaded object, attached to the arm unit. The support unit includes a base portion capable of revolving around a raising/lowering axis and a head portion rotatably attached to the base portion. The arm unit includes arms that are rotatably attached to the head portion. Front ends of the arms move forward and backward along a forward/backward direction that passes the head portion. The hand unit includes a loading/unloading hand rotatably attached to the arm. A center distance from the rotational axis of the head portion to the rotational axes of rear arms is shorter than a center distance from an axis of revolution of the base portion to the rotational axis of the head portion.

7 Claims, 8 Drawing Sheets

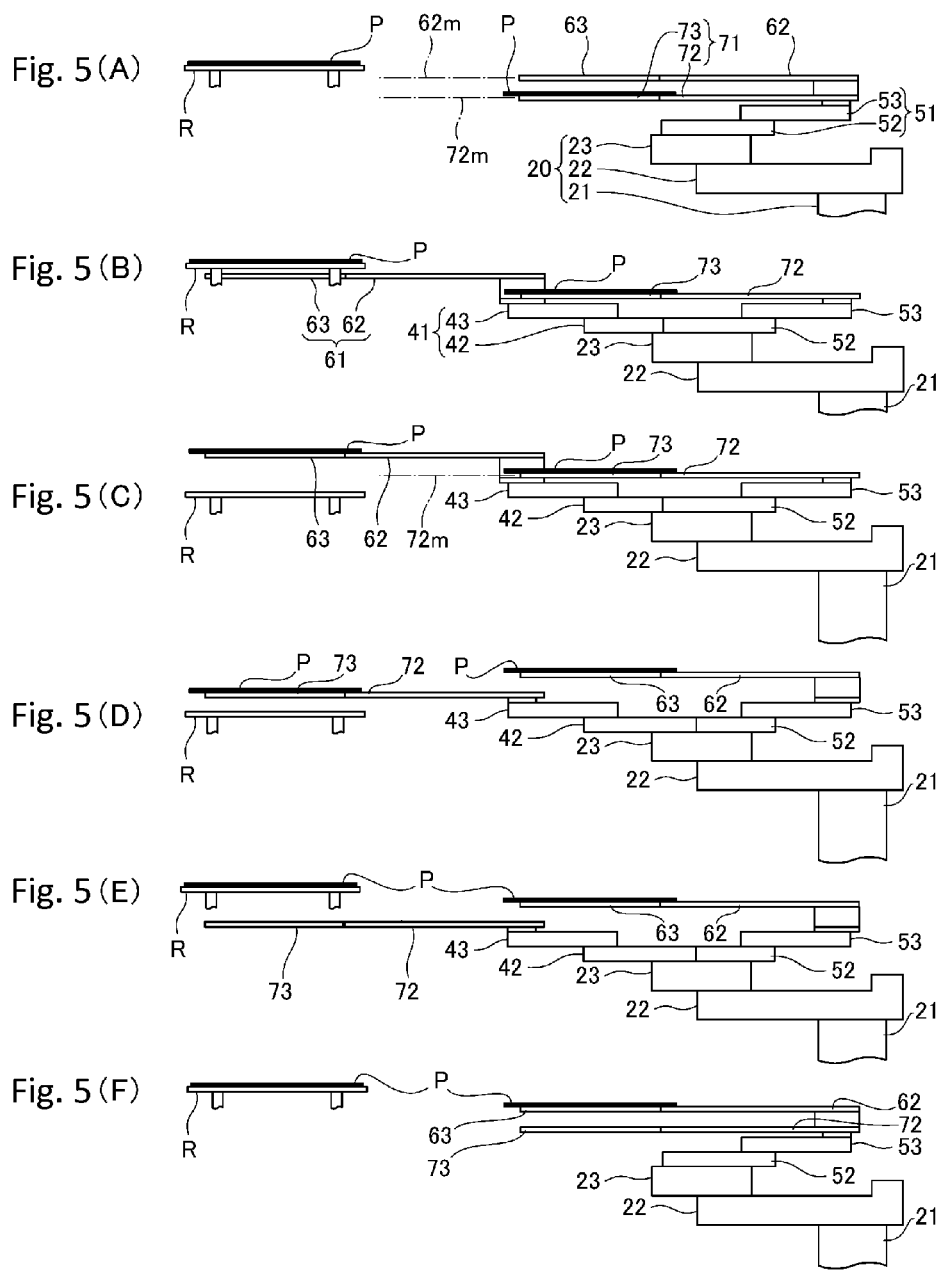

LOADING/UNLOADING ROBOT

FIELD OF THE INVENTION

The present invention relates to a loading/unloading robot for conveying a material in the form of a thin plate (such as a panel, sheet, or wafer) which is a material of a digital device, and to a loading/unloading system equipped with a loading/unloading robot.

DESCRIPTION OF THE RELATED ART

One example of a loading/unloading robot is a wafer conveying robot (see Patent Document 1) including a support table capable of being raised and lowered, a first arm portion rotatably supported on the support table, a second arm portion rotatably supported on the first arm portion, an arm revolving mechanism incorporated into the first arm portion, two double-link arms provided on the second arm portion, and a double-link arm revolving mechanism incorporated into the second arm portion.

Such wafer conveying robot has a construction where the double-link arm is mounted on the front end of a two-jointed arm of a SCARA (Selective Compliance Assembly Robot Arm)-type robot (see Paragraph 0033 of Patent Document 1) and the front end of the arm of the SCARA-type robot is capable of moving to an arbitrary position within a circle produced by extending the arm. By using a SCARA-type robot with such construction, this wafer conveying robot is intended to enable the double-link arms to move to an arbitrary predetermined position using the shortest distance.

PATENT DOCUMENT 1

Japanese Laid-Open Patent Publication No. 2010-82742

SUMMARY OF THE INVENTION

However, to enable the front end of a two-jointed arm of a SCARA-type robot to move to an arbitrary position, it is necessary to construct the two-jointed arm by combining arms of the same length. Accordingly, there is little design freedom for the arm of a robot.

Also, by using such wafer conveying robot, to realize an operation that moves a double-link arm to an arbitrary predetermined position using the shortest distance, it is necessary to use all types of movement that can be carried out by the two-jointed arm of the SCARA-type robot. That is, to move a double-link arm using the shortest distance, complex movements are required as the movement of the two-jointed arm and a control means for stably realizing such complex movements also becomes necessary.

In addition, if the operation of a two-jointed arm that is making a complex operation has stopped midway, in many cases it will be extremely difficult to determine what operation has stopped midway, even when the stopped state is viewed. Accordingly, with this type of conveying robot, if the operation stops for some reason, a long time will then be required for the conveying robot to recover.

The present invention was conceived in view of the problems described above and has an object of providing a loading/unloading robot constructed to allow higher design freedom for robot design and to make the robot operate more simply.

A loading/unloading robot according to the present invention includes: a support unit installed so as to be capable of being raised and lowered; an arm unit attached to the support unit; and a hand unit for conveying an object to be loaded and unloaded, attached to the arm unit, wherein the support unit includes a base portion that can be revolved around a raising/lowering axis that extends in a raising/lowering direction and a head portion rotatably attached to the base portion, the arm unit includes an arm that is rotatably attached to the head portion, a front end of the arm moves forward and backward along a forward/backward direction that passes the head portion, the hand unit includes a loading/unloading hand rotatably attached to the front end of the arm, and a center distance from the rotational axis of the head portion to the rotational axis of a rear portion of the arm is shorter than a center distance from an axis of revolution of the base portion to the rotational axis of the head portion.

A head base-end portion where the rotational axis of the head portion is positioned may be attached on a head portion installation surface of the base portion, a rear arm base-end portion where the rotational axis of the rear arm is positioned may be attached to a head front portion equipped with an rear arm installation surface, a height of an upper surface of the head front portion may be a lower position than an upper surface of the head base-end portion, and a height of a lower surface of the head front portion may be a lower position than the head portion installation surface.

At least One of the base portion and the head portion may include a rotation restricting member that restricts a range of rotation of the head portion.

The object to be loaded and unloaded may be loaded into and unloaded from a loading/unloading destination where loading/unloading is possible by moving the object to be loaded and unloaded forward and backward, the base portion may be a rotational axis positioning unit that revolves to produce a state where the rotational axis of the head portion is positioned on a loading/unloading line that passes through a center of a predetermined loading/unloading destination, the arm may move a loading/unloading hand attached to a front end portion of the arm forward and backward in the forward/backward direction, and the head portion may be a forward/backward direction deciding unit that is operable when the rotational axis of the head portion has been positioned on the loading/unloading line, to rotate so that a forward/backward movement line, which is a movement path of the rotational axis of the loading/unloading hand, is positioned on the loading/unloading line.

The support unit may include a controller that causes the base portion to revolve so that the rotational axis of the head portion is positioned on a loading/unloading line of a predetermined loading/unloading destination and is operable in a state where the rotational axis of the head portion has been positioned on the loading/unloading line, to cause the head portion to revolve so that the forward/backward movement line of the loading/unloading hand is positioned on the loading/unloading line.

The loading/unloading robot may load and unload the object to be loaded and unloaded into or from one out of a plurality of loading/unloading destinations disposed so that the loading/unloading lines pass through a range of revolution of a rotational axis position of the base portion.

The loading/unloading robot may load and unload the object to be loaded and unloaded into or from one out of a plurality of loading/unloading destinations disposed so that there is at least one intersection where the loading/unloading lines intersect one another and each intersection is a position inside the range of revolution.

The loading/unloading robot may load and unload the object to be loaded and unloaded into or from one of the plurality of loading/unloading destinations that are disposed in a state where each intersection is a position on a line of revolution of the rotational axis position of the base portion.

According to the present invention, when loading and unloading an object to be loaded and unloaded, it is possible to revolve the base portion by way of a simpler revolution operation, which means that loading and unloading can be carried out rapidly and it is simple to carry out operation control of the support unit by way of a revolution operation of the base portion. Since the arm unit is attached to the head portion, it is also simple to carry out operation control of the arm unit.

BRIEF DESCRIPTION OF THE DRAWINGS

FIGS. 5A to 5F are side views useful in explaining a panel loading/unloading operation of the loading/unloading robot shown in FIG. 1;

DESCRIPTION OF THE PREFERRED EMBODIMENTS

A loading/unloading robot according to the present invention is used to load and unload a panel material (loaded/unloaded object) in the form of a thin plate used to manufacture a liquid crystal panel.

Embodiments of a loading/unloading robot according to the present invention will now be described in detail with reference to the drawings.

First Embodiment

Figure 1:
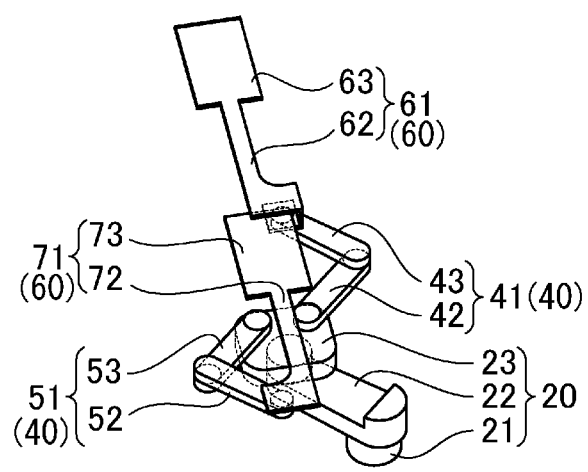
FIG. 1 is a perspective view showing a loading/unloading system in which a loading/unloading robot that is a first embodiment of the present invention has been installed.

As shown in FIG. 1, the loading/unloading robot 10 according to the present embodiment includes a support unit 20 installed so as to be capable of being raised and lowered, an arm unit 40 (41, 51) attached to the support unit, and a hand unit 60 attached to the arm unit 40.

The support unit 20 includes a pillar portion 21 installed so as to be capable of being raised and lowered, a base portion 22 fixed to the pillar portion 21, and a head portion 23 attached to the base portion 22.

The pillar portion 21 is capable of being raised and lowered in the vertical direction and is also capable of rotating (revolving) around a vertical axis a1 of the pillar portion 21. When the pillar portion 21 is raised or lowered and rotates (revolves), the base portion 22 that is integrally fixed to the pillar portion 21 is also raised or lowered and rotates (revolves).

Figure 2:
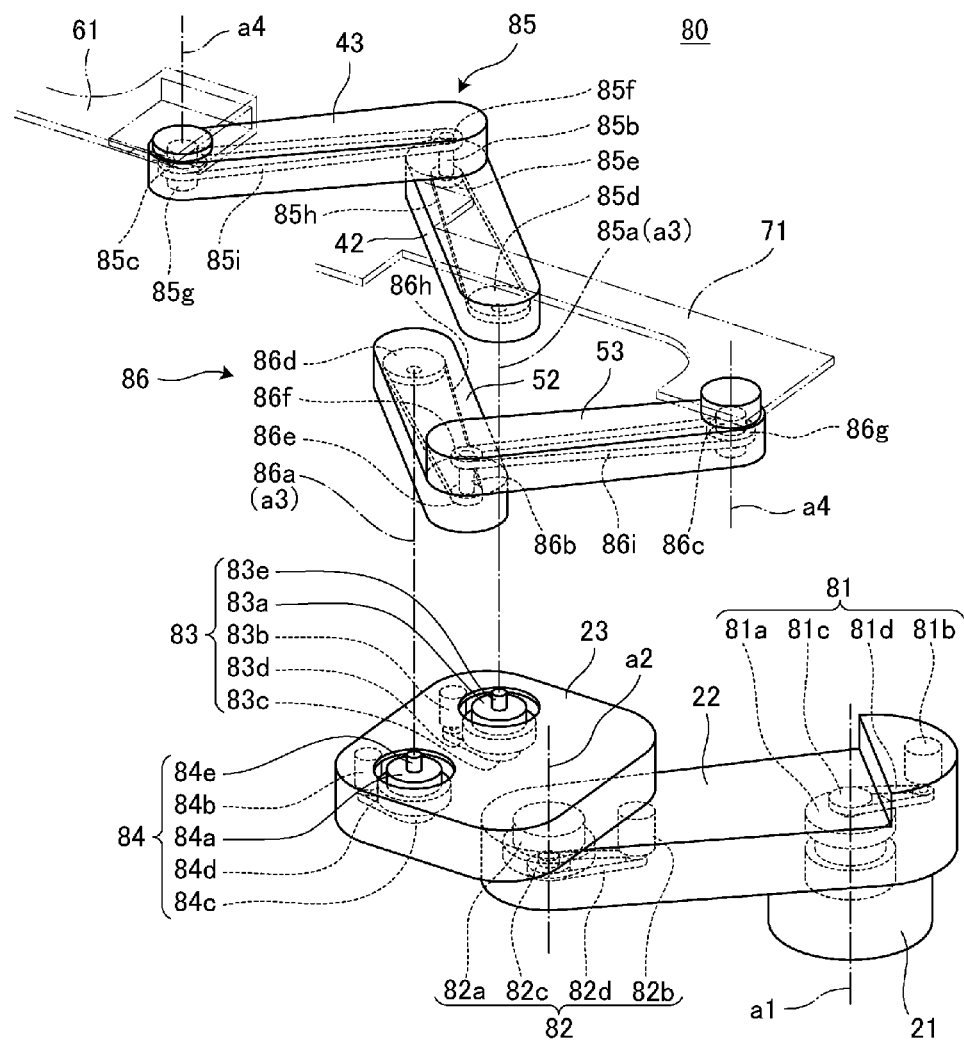
FIG. 2 is an exploded perspective view showing the loading/unloading robot shown in FIG. 1.

The base portion 22 extends horizontally from a rear portion fixed to the pillar portion 21 and at a front portion of the base portion 22, the head portion 23 is supported so as to be rotatable around a second rotational axis a2 (see FIG. 2). By doing so, with the base portion 22, a revolution axis portion including the revolution axis a1 is disposed at the rear portion of the base portion 22 and a second rotational axis portion including the second rotational axis a2 is disposed at the front portion of the base portion 22.

The center distance (i.e., radius of revolution of the base portion) L1 (see FIG. 3B) from the vertical axis (revolution axis) a1 of the base portion 22 to the second rotational axis a2 matches an intersection separation distance L5 (see FIG. 4A) described later. By using this construction, as described later, it is possible to carry out operation control of the support unit 20 by way of a revolving operation of the base portion 22 more easily.

The head portion 23 is attached to the base portion 22 so as to be rotatable around the second rotational axis a2. In addition, rear portions 42a, 52a of left and right arms 41, 51, described later, that construct an arm unit 40 are attached to the head portion 23 so as to be rotatable around axes of rotation a3. In this way, the head portion 23 has a second rotational axis portion with the second rotational axis a2 disposed at the rear portion of the head portion 23 and a third rotational axis portion with the third axes of rotation a3 disposed at a front portion of the head portion 23.

The center distance (i.e., rotational radius of the head portion) L2 from the second rotational axis a2 of the head portion 23 to the third rotation axes a3 that are the axes where the arms are supported is shorter than the center distance L1 from the vertical axis a1 of the base portion 22 to the second rotational axis a2. By using this construction, it is possible to carry out operation control of the support unit 20 by way of a rotational operation of the head portion 23 more easily and also to carry out operation control of the arm unit 40 more easily.

Figure 3A:
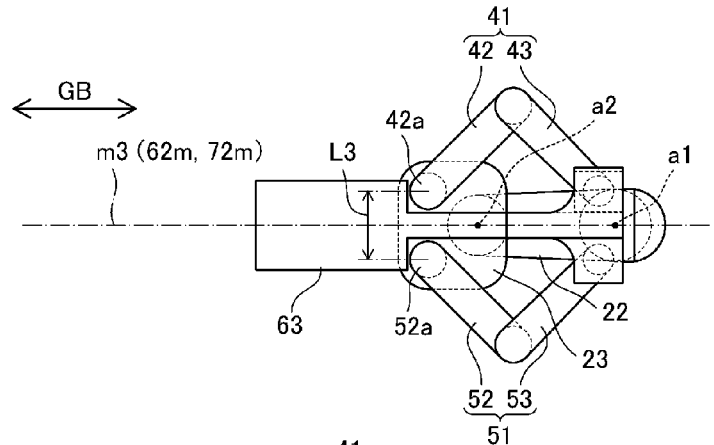
FIGS. 3A to 3C are plan views useful in explaining a forward/backward movement operation of an arm unit of the loading/unloading robot shown in FIG. 1.
Figure 3B:
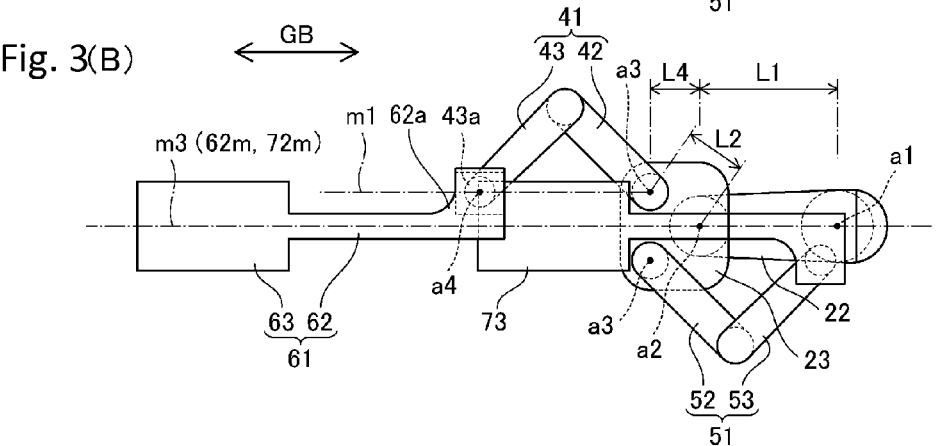
Figure 3C:
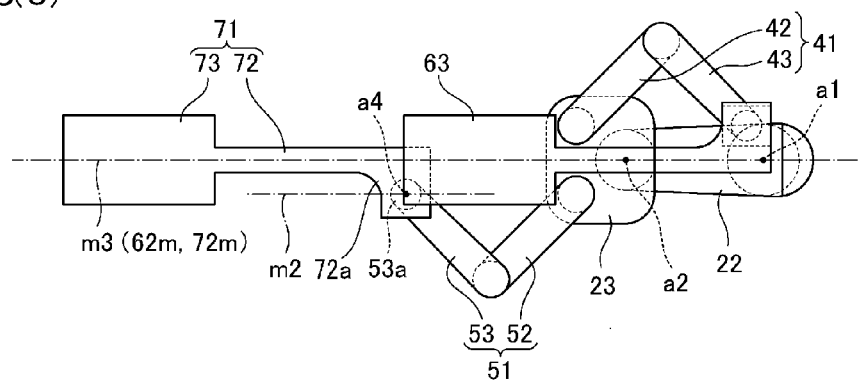

As shown in FIGS. 3A to 3C, the arm unit 40 includes multi-jointed arms 41, 51 that form a left-right pair.

Out of such arms, the right arm (one arm) 41 disposed on the right side (one side) includes a first right arm (rear arm) 42 that is rotatably attached to the head portion 23 and a second right arm (front arm) 43 that is rotatably attached to the first arm 42. At the rear portion 42a, the first arm 42 is rotatably attached to the third rotational axis portion of the head portion 23 that is provided with the right-side third rotational axis a3. Also, a rear portion of the second arm 43 is rotatably attached to the front portion of the first arm 42.

Figure 8:
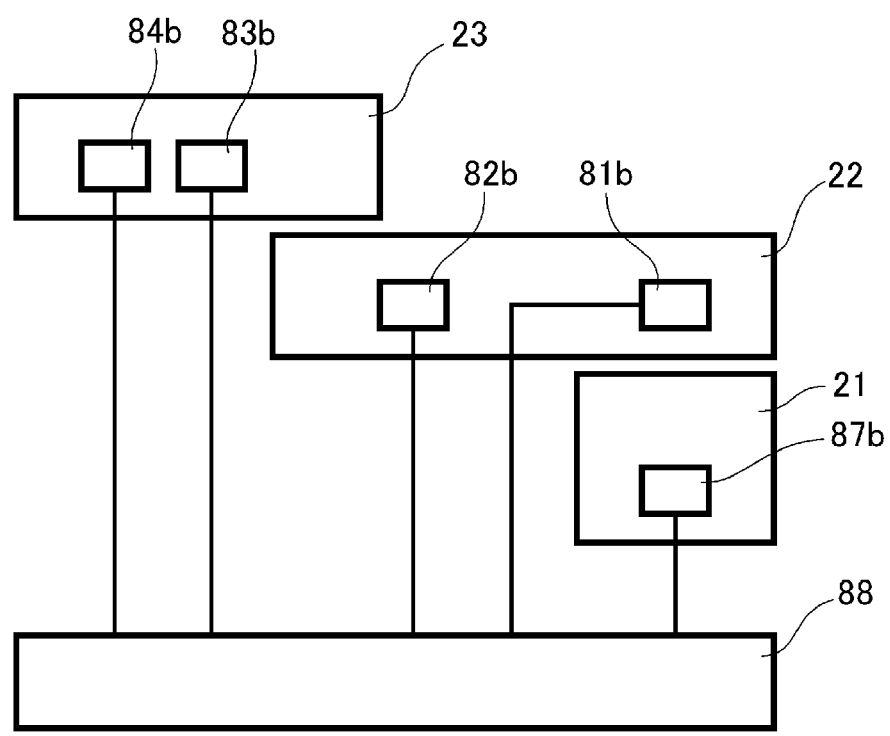
FIG. 8 is a block diagram showing the relation of a controller and some elements of a driving mechanism shown in FIG. 2.

Operation of the right arm 41 is controlled by a controller 88 (see FIG. 8) described later so that a front end portion 43a of the second arm 43 positioned at the front end of the right arm 41 moves in a straight line. In more detail, a hand supporting axis a4 at the front end portion 43a of the right arm 41 is moved forward and backward (linear movement) along a straight line m1 in a forward/backward direction GB that passes above the head portion 23.

The left arm (other arm) 51 disposed on the left side that is the other side includes a first left arm 52 that is rotatably attached to the head portion 23 and a second left arm 53 that is rotatably attached to the first arm 52. At a rear portion 52a of the first arm 52, the first arm 52 is rotatably attached to a third rotational axis portion provided with the left-side third rotational axis a3, and movement of a front end portion 53a of the left arm 51 is controlled by a controller 88 so as to move forward and backward along a straight line m2 in the forward/backward direction GB that passes the head portion 23. In this way, the construction and operation of the left arm 51 exhibit left/right symmetry with the right arm 41.

Note that the center distance L3 (see FIG. 3A) between the rotational axes a3, a3 of both arms 41, 51 is shorter than the center distance L1 (see FIG. 3B) from the vertical axis a1 of the head portion 23 to the second rotational axis a2. The center distance L4 in the forward/backward direction from the second rotational axis a2 of the head portion 23 to each third rotational axis a3 of the respective arms is shorter than the center distance L3 between the third rotational axes a3, a3 of both arms.

Also, the forward/backward direction GB is a direction that is set using the head portion 23 as a reference and in the present embodiment is the horizontal direction which is perpendicular to a straight line that joins both axes of rotation a3 of the head portion 23.

That is, the front end portions 43a, 53a of the respective arms 41, 51 described above always move forward and backward with respect to the head portion 23 on predetermined straight lines m1, m2. The arms 41, 51 that carry out simple operations in this way are easy to control and can be controlled with superior stability.

As shown in FIG. 3B, the hand unit 60 includes an upper hand (loading/unloading hand) 61 attached to the right arm 41 and a lower hand 71 attached to the left arm 51.

Out of such hands, the upper hand 61 is equipped with an upper rod portion 62 attached to the second arm 43 of the right arm 41 and an upper hand portion 63 attached to a front end of the upper rod portion 62.

The upper rod portion 62 is rotatably attached to the front end portion 43a of the second arm 43 and is controlled by a driving mechanism 80 (see FIG. 2) and a controller 88 (see FIG. 8) so that the orientation of the length direction of the upper rod portion 62 is always in the forward/backward direction GB. Accordingly, the upper hand 61 moves in the forward/backward direction GB in a state where the length direction of the upper rod portion 62 is always oriented in the forward/backward direction GB. The upper rod portion 62 is also provided with an offset portion 62a at a base-end part of the upper rod portion 62, and moves forward and backward along a straight line m3 in the forward/backward direction GB so as to pass directly above the second rotational axis a2 of the head portion 23.

On the other hand, aside from being disposed lower than the upper hand 61, the lower hand 71 is constructed with left/right symmetry with respect to the upper hand 61 (see FIG. 3C). For this reason, corresponding members have been assigned corresponding reference numerals (as examples, the first arm of the left arm 51 that corresponds to the first arm 42 of the right arm 41 has been assigned the reference numeral "52", the rear portion of the first arm 52 on the left that corresponds to the rear portion 42a of the first arm 42 on the right has been assigned the reference numeral "52a", and the lower hand that corresponds to the upper hand 61 has been assigned the reference numeral "71") and description of such corresponding members is omitted here.

Note that a forward/backward movement line 72m (see FIG. 5A) that matches a forward/backward movement path where a lower rod portion 72 moves along the straight line m3 is positioned directly below a forward/backward movement line 62m that matches a forward/backward movement path where the upper rod portion 62 moves along the straight line m3 and the forward/backward movement lines 62m, 72m are parallel.

The loading/unloading robot 10 according to the present embodiment is also equipped with the driving mechanism 80, which realizes movement such as raising and lowering of the pillar portion 21 of the support unit 20, revolution of the base portion 22, rotation of the head portion 23, and forward and backward movement of the arm unit 40 and the hand unit 60, and a controller 88 for controlling the driving mechanism 80.

As shown in FIG. 2, the driving mechanism 80 is equipped with a base revolving mechanism 81 that revolves the base portion 22, a head rotating mechanism 82 that revolves the head portion 23, a right extending/retracting mechanism 83 that bends and extends the right arm 41 to cause the upper hand 61 to move forward and backward, and a left extending/retracting mechanism 84 that bends and extends the left arm 51 to cause the lower hand 71 to move forward and backward. In addition, the driving mechanism 80 is equipped with a raising/lowering motor 87b (see FIG. 8) that raises and lowers the pillar portion 21.

The base revolving mechanism 81 is equipped with a revolution reducer 81a that is interposed in a revolution axis portion that supports the base portion 22 so as to be capable of revolution with respect to the pillar portion 21, a revolution motor 81b that is incorporated in the base portion 22, and a belt 81d that transmits a rotational force of the revolution motor 81b to a driving side pulley 81c of the revolution reducer 81a. Since the driven side of the revolution reducer 81a is fixed to the pillar portion 21, when the revolution motor 81b inside the base portion 22 is operated, the base portion 22 revolves.

The head rotating mechanism 82 is equipped with a rotation reducer 82a that is interposed in a rotational axis portion that supports the head portion 23 so as to be able to revolve with respect to the base portion 22, a rotation motor 82b that is incorporated in the base portion 22, and a belt 82d that transmits a rotational force of the rotation motor 82b to a driving side pulley 82c of the rotation reducer 82a. Since the driven side of the rotation reducer 82a is fixed to the head portion, when the rotation motor 82b in the base portion 22 is operated, the head portion 23 revolves.

The right extending/retracting mechanism 83 is equipped with a rotation reducer 83a that is interposed in a third rotational axis portion that supports the first arm 42 of the right arm 41 so as to be rotatable with respect to the head portion 23, a rotation motor 83b that is incorporated in the head portion 23, a belt 83d that transmits a rotational force of the rotation motor 83b to a driving side pulley 83c of the rotation reducer 83a, and an extending/bending power transmitting portion 85 that causes the right arm 41 to extend and bend together when a driven-side rotational shaft 83e of the rotation reducer 83a rotates.

The extending/bending power transmitting portion 85 includes a first rotational shaft 85a that supports the rear portion of the first arm 42 so as to be rotatable with respect to the head portion 23, a second rotational shaft 85b that supports the second arm 43 so as to be rotatable with respect to the first arm 42, and a third rotational shaft 85c that supports the upper hand 61 so as to be rotatable with respect to the second arm 43. The first rotational shaft 85a is integrally connected to the driven-side rotational shaft 83e of the rotation reducer 83a and a driving pulley 85d is installed inside the first arm 42 at an end portion thereof. Intermediate pulleys 85e, 85f are attached to both ends of the second rotational shaft 85b that are respectively positioned inside the first arm 42 and the second arm 43. In addition, a driven pulley 85g is attached to an end portion of the third rotational shaft 85c positioned inside the second arm 43, and an upper hand 61-side end portion of the third rotational shaft 85c is rotatably connected to the upper hand 61. The driving pulley 85d and the intermediate pulley 85e are therefore caused to move together by a belt 85h and the intermediate pulley 85f and the driven pulley 85g are caused move together by a belt 85i.

Accordingly, when the rotation motor 83b is operated, the rotation of the motor is transmitted via the rotation reducer 83a to the first rotational shaft 85a of the extending/bending power transmitting portion 85, the right arm 41 bends or extends, and the upper hand 61 moves forward or backward. The diameters of the pulleys 85d to 85g of the extending/bending power transmitting portion 85 are set so that the third rotational shaft 85c at the front end (the rear portion of the upper hand 61) of the second arm 43 moves in a straight line in the forward/backward direction GB when the right arm 41 bends or extends. Accordingly, by operating the rotating motor 83b, it is possible to move the upper hand 61 forward and backward in the forward/backward direction GB.

Note that the construction and operation of the left extending/retracting mechanism 84 for moving the lower hand 71 forward and backward when the left arm 51 bends and extends exhibit left/right symmetry with the right extending/retracting mechanism 83. For this reason, corresponding members have been assigned corresponding reference numerals (as examples, the left rotation reducer that corresponds to the right rotation reducer 83a has been assigned the reference numeral "84a" and the first rotational shaft of an extending/bending power transmitting portion 86 on the left that corresponds to the first rotational shaft 85a of the extending/bending power transmitting portion 85 on the right has been assigned the reference numeral "86a") and description of such corresponding members is omitted here.

The controller 88 (see FIG. 8) carries out control that realizes the operations described later in this specification, which for example includes posture control to place the loading/unloading robot 10 into a predetermined posture, panel receiving operation control, panel interchanging operation control, and panel unloading operation control. That is, the controller 88 carries out control that realizes those operations by controlling the motors 81b,82b,83b,84b,87b described above. Note that the driving mechanism 80 and the controller 88 are well-known and detailed description thereof is omitted here.

Figure 4A:
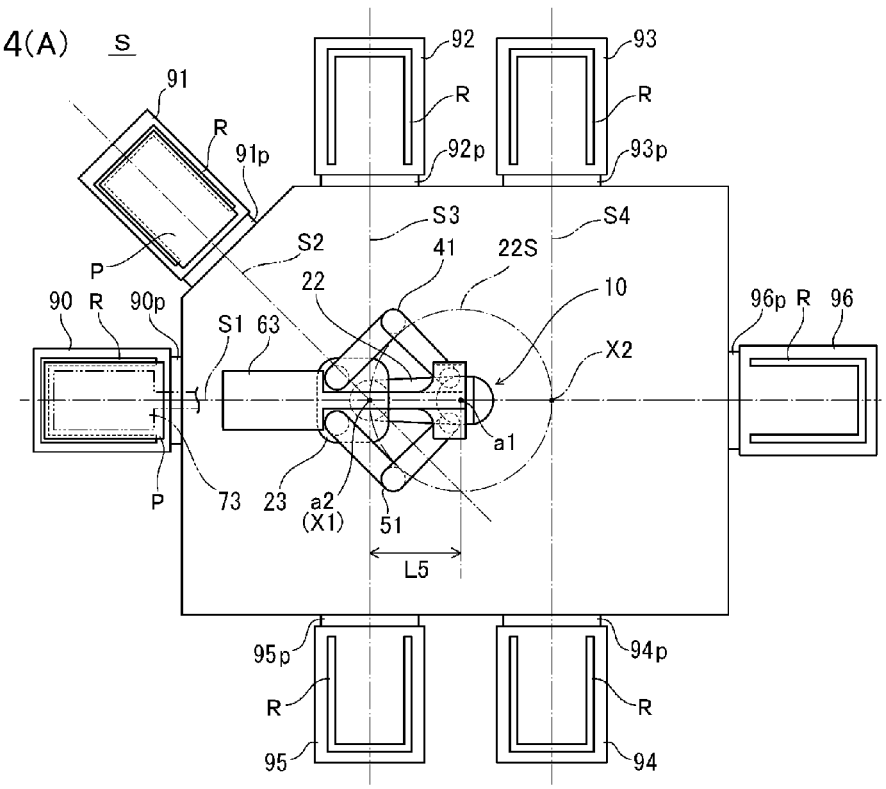
FIGS. 4A and 4B are plan views useful in explaining the operation of the loading/unloading robot shown in FIG. 1.

Also, as shown in FIG. 4A, the loading/unloading robot 10 according to the present embodiment is used in a panel processing apparatus that processes a panel material P (hereinafter, simply "panel P") that is to be conveyed.

A panel supplying unit 90 equipped with a supply port 90p for panels, panel processing units 91 to 95 equipped with panel loading/unloading ports 91p to 95p, and an unloading port 96p that is the unloading destination of panels P that have been processed are installed at positions adjacent to the loading/unloading robot 10 so that the loading/unloading robot 10 is surrounded by the respective ports (i.e., the destinations for loading and unloading panels). As one example, the loading/unloading robot 10 is disposed inside a chamber or an EFEM (Equipment Front End Module) and the respective ports are connected to such chamber or EFEM. Panel processing apparatuses that have such ports and the loading/unloading robot 10 construct a panel loading/unloading system S where favorable operation is possible at the panel processing apparatuses.

Note that in the drawings such as FIG. 4A, constructions such as the loading/unloading openings for panels provided at the respective ports have been omitted for ease of explanation.

A rack R on which a panel P to be loaded or unloaded is placed is installed in each of the panel supplying unit 90, the panel processing units 91 to 95, and the panel unloading unit 96. Note that although the racks R installed in the present embodiment are single-story racks, it is also possible to use multistory racks where a plurality of panels P can be placed in the up-down direction. It is also possible to use wire trays or semiconductor wafer containers as the racks R.

The panels P are loaded into and unloaded from the respective ports 90p to 96p via openings (not shown) that face the loading/unloading robot side. Via the ports 90p to 96p, it is possible to linearly load and unload the panels P into and from the racks R installed in the panel supplying unit 90 and the like.

FIG. 4A shows linear loading/unloading lines S1 to S4 that pass through the centers of the respective ports 90p to 96p.

As shown in FIG. 4A, the ports 90p to 96p are all disposed so that the loading/unloading lines S1 to S4 all pass inside a range of a line of revolution 22S of the second rotational axis a2 of the base portion 22.

Also, in this panel loading/unloading system S, a port layout is used where there is at least one intersection where the loading/unloading lines of the respective ports intersect one another.

In the present embodiment, as one example, there is a first intersection X1 where the loading/unloading line S1 of the supply port 90p (unloading port 96p), the loading/unloading line S2 of the first panel loading/unloading port 91p, and the loading/unloading line S3 of the second panel loading/unloading port 92p (the fifth panel loading/unloading port 95p) intersect. There is also a second intersection X2 where the loading/unloading line S4 of the third panel loading/unloading port 93p (the fourth panel loading/unloading port 94p) and the loading/unloading line S1 of the unloading port 96p intersect.

Such intersections X1, X2 are both positioned inside the range of the line of revolution 22S mentioned above. In more detail, the respective intersections X1, X2 are positioned in the range of revolution so as to be positioned on the line of revolution 22S (arc of revolution). The intersection separation distance L5 from the raising/lowering axis a1 of the base portion 22 to the respective intersections X1, X2 matches the center distance (the radius of revolution of the base portion) L1 (see FIG. 3B) from the vertical axis (axis of revolution) a1 of the base portion 22 to the second rotational axis a2.

Next, the operation of the loading/unloading robot according to the present embodiment will be described.

Here, the operation of the loading/unloading robot 10 will be described for a case where a panel P that has been received at the panel supplying unit 90 (see FIG. 4A) is processed by the first panel processing unit 91.

Also, the operation of the loading/unloading robot 10 will be explained with a state where a panel P being processed is present in the first panel processing unit 91 and panels have not been loaded on the upper hand 61 or the lower hand 71 of the loading/unloading robot 10 as a starting point.

The description of the positional relationships between the loading/unloading lines S1 to S4, the various axes a1 to a4, the forward/backward movement lines 62m, 72m, and the like given below is based on positional relationships in a state where the loading/unloading robot 10 is viewed from above.

Panel Receiving Process

First, a process where an unprocessed panel P that is to be newly loaded into the first panel processing unit 91 is received from the panel supplying unit 90 will be described.

In this process, first, the posture of the loading/unloading robot 10 is placed in a posture where it is capable of receiving a panel from the panel supplying unit 90 (posture control). More specifically, first the base portion 22 is revolved and the second rotational axis a2 at the front end of the base portion 22 is positioned on the loading/unloading line S1 of the supply port 90p (see FIG. 4A). The base portion 22 also aligns the forward/backward movement lines m3 (see FIGS. 3A to 3C) of both rod portions 62, 72 with the loading/unloading line S1 of the supply port 90p (see FIG. 4A). That is, posture control is carried out to produce a state where the base portion 22 and the head portion 23 face the panel supplying unit 90.

In addition, the pillar portion 21 is raised or lowered so that the height of a hand (here, the lower hand 71) that has advanced toward the supply port 90p is at a position in the height direction where it is possible for the hand to advance below the rack R that holds the panel P inside the panel supplying unit 90. Once this state is reached, it is possible to linearly move the lower hand 71 in the forward/backward direction GB so as to load and unload into and from the supply port 90p.

Note that the revolution operation of the base portion 22, the rotation operation of the head portion 23, and the raising/lowering operation of the pillar portion 21 may be carried out at the same time. Although omitted from the explanation of operations given below, this also applies to the operations described below.

Next, the lower hand 71 is moved forward inside the panel supplying unit 90 and a lower hand portion 73 is positioned below the panel P to be processed inside the panel supplying unit 90 (see the dot-dot-dash line in FIG. 4A). After this, the pillar portion 21 is raised to raise the lower hand portion 73 and after the lower hand portion 73 has received the panel P, the lower hand portion 73 is moved backward (control of panel receiving operation). By doing so, reception of the panel P is completed and a state where it is possible to revolve the loading/unloading robot 10 or to rotate the hand unit is achieved.

First Panel Interchanging Process

Once the receiving of a panel P has been completed, next an interchanging process for panels P is carried out at the first panel processing unit 91.

Figure 4B:
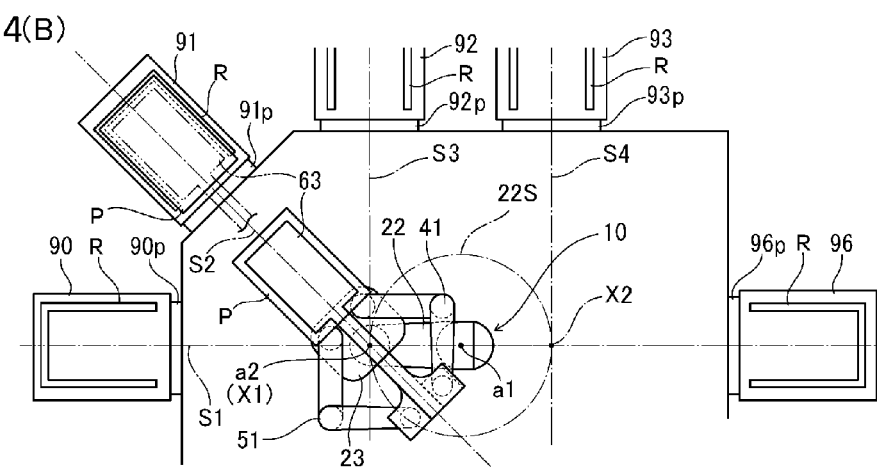

In this process, first, the posture of the loading/unloading robot 10 is placed in a posture where it is possible to interchange the panels P at the first panel processing unit 91. More specifically, the head portion 23 is rotated (swung) to the right by 45° so that the forward/backward movement lines m3 (see FIGS. 3A to 3C) of both rod portions 62, 72 are aligned with the loading/unloading line S2 of the first panel loading/unloading port 91p (see FIG. 4B). Also, the pillar portion 21 is raised or lowered so that the height of the upper hand 61 (i.e., the hand that is to advance toward the first panel processing unit 91 first) is placed at a position in the height direction where the upper hand 61 is capable of advancing below a rack R that holds a processed panel P inside the first panel processing unit 91 (see FIG. 5A). Once this state is reached, it is possible for the upper hand 61 to linearly move in the forward/backward direction GB and load into and unload from the first panel loading/unloading port 91p.

Next, the upper hand 61 is moved forward inside the first panel loading/unloading port 91p and an upper hand portion 63 is positioned below the processed panel P (see FIG. 5B). After this, the pillar portion 21 is raised to raise the upper hand portion 63 so that the processed panel P is received by the upper hand portion 63 (see FIG. 5C). When doing so, the height of the lower hand portion 73 (the height of the forward/backward movement line 72m) holding the panel P to be processed is set at a height where the lower hand portion 73 is capable of advancing above the rack R inside the first panel processing unit 91.

Next, together with the upper hand portion 63 being moved backward, the lower hand 71 is moved forward inside the first panel loading/unloading port 91p and the lower hand portion 73 is positioned above the rack R (see FIG. 5D). The pillar portion 21 is then lowered to lower the lower hand portion 73 and the panel P to be processed (i.e., the unprocessed panel P) placed on the lower hand portion 73 is placed on the rack R inside the first panel processing unit 91 (see FIG. 5E). After this, the lower hand 71 is moved backward (control of panel interchanging operation). By doing so, the interchanging operation of panels is completed (see FIG. 5F), and it becomes possible to revolve the loading/unloading robot 10 and to rotate the hand unit 60.

After this, as one example, if the panel on the upper hand 61 that has been processed by the first panel processing unit 91 is to be processed at the second panel loading/unloading port 92p, the head portion 23 may be rotated further to the right by 45° (making a total of 90°) or the base portion 22 may be revolved to the right by 45° with the head portion 23 as it is and then the lower hand 71 and the upper hand 61 may be moved forward and backward.

As described earlier, during posture control of the loading/unloading robot 10 in this process, since an operation that revolves the base portion 22 is unnecessary (see FIG. 4A), it is possible to rapidly change the posture of the loading/unloading robot 10 to a desired posture by merely rotating the head portion 23, which means that it is possible to rapidly commence a panel interchanging operation. An operation of revolving the base portion 22 is unnecessary in the posture control operation of this process firstly because the base portion 22 is a rotational axis position determining means that revolves the second rotational axis a2 of the head portion 23 (see FIG. 4A) so as to be positioned on a desired loading/unloading line. That is, once a revolution operation has been carried out to realize a state where the second rotational axis a2 is positioned on a desired loading/unloading line, it is thereafter unnecessary to revolve the base portion 22. Note that the base portion 22 that is a means for positioning the second rotational axis a2 of the head portion 23 that is directly supported on the base portion 22 differs completely in object, function, and movement to the respective joints that construct a multi-jointed arm. The respective joints of a multi-jointed arm normally make complex movements to position the front end of the multi-jointed arm at a desired position.

That is, the revolution operation described above is unnecessary secondly because the supply port 90p of the panel supplying unit 90 (see FIG. 4A) and the first panel loading/unloading port 91p of the first panel processing unit 91 are disposed so that the loading/unloading line S1 of the supply port 90p and the loading/unloading line S2 of the first panel loading/unloading port 91p intersect, and additionally the supply port 90p and the first panel loading/unloading port 91p are disposed so that such intersection X1 is positioned on the arc of revolution 22S. If this type of layout is used for the supply port 90p and the first panel loading/unloading port 91p, by positioning the second rotational axis a2 of the head portion 23 at the intersection X1, it is possible to position such second rotational axis a2 on a plurality of loading/unloading lines S1, S2 in a single operation.

As a third reason, the intersection separation distance L5 from the raising/lowering axis a1 of the base portion 22 to the respective intersections X1, X2 (see FIG. 4A) matches the center distance from the vertical axis a1 of the base portion 22 to the second rotational axis a2 (see FIG. 3B). This is because this construction makes it possible to position the second rotational axis a2 of the base portion 22 on a plurality of loading/unloading lines in a single operation by merely positioning the second rotational axis a2 of the base portion 22 at a predetermined intersection.

As a fourth reason, the revolution operation described above is unnecessary because the base portion 22 is constructed so as to be rotatable around the second rotational axis a2 and, in a state where the second rotational axis a2 has been positioned on a loading/unloading line (for example, S1), is also a means for deciding the orientation of the forward/backward movement lines m3 of the hands 61, 71 so that the forward/backward movement lines m3 of the hands 61, 71 are positioned on a desired loading/unloading line (for example, S2). With this construction, once the second rotational axis a2 has been positioned on the loading/unloading line (for example, S2) of one of the ports, the forward/backward movement lines m3 of the hands 61, 71 (see FIGS. 3A to 3C) supported on the head portion 23 will always intersect such loading/unloading line S2 regardless of how the head portion 23 is rotated in such state. Accordingly, by carrying out an operation of merely rotating the head portion 23, it is possible to simply align the forward/backward movement lines m3 of the hands 61, 71 with a loading/unloading line (for example, S2) (see FIG. 4B).

Also, with a construction where the forward/backward movement lines m3 of the hands 61, 71 are aligned with the loading/unloading line of the desired port by rotating the head portion 23, it is unnecessary to control the operation of the left and right arms 41, 51 in order to align the forward/backward movement lines of the hands with the loading/unloading line of the desired port. That is, the left and right arms 41, 51 are constructed so as to move with respect to the head portion 23 only in the predetermined forward/backward direction GB. Accordingly, operation control of the left and right arms is simple and it is possible to easily realize a stabilized forward/backward movement operation.

Second Embodiment

Figure 6:
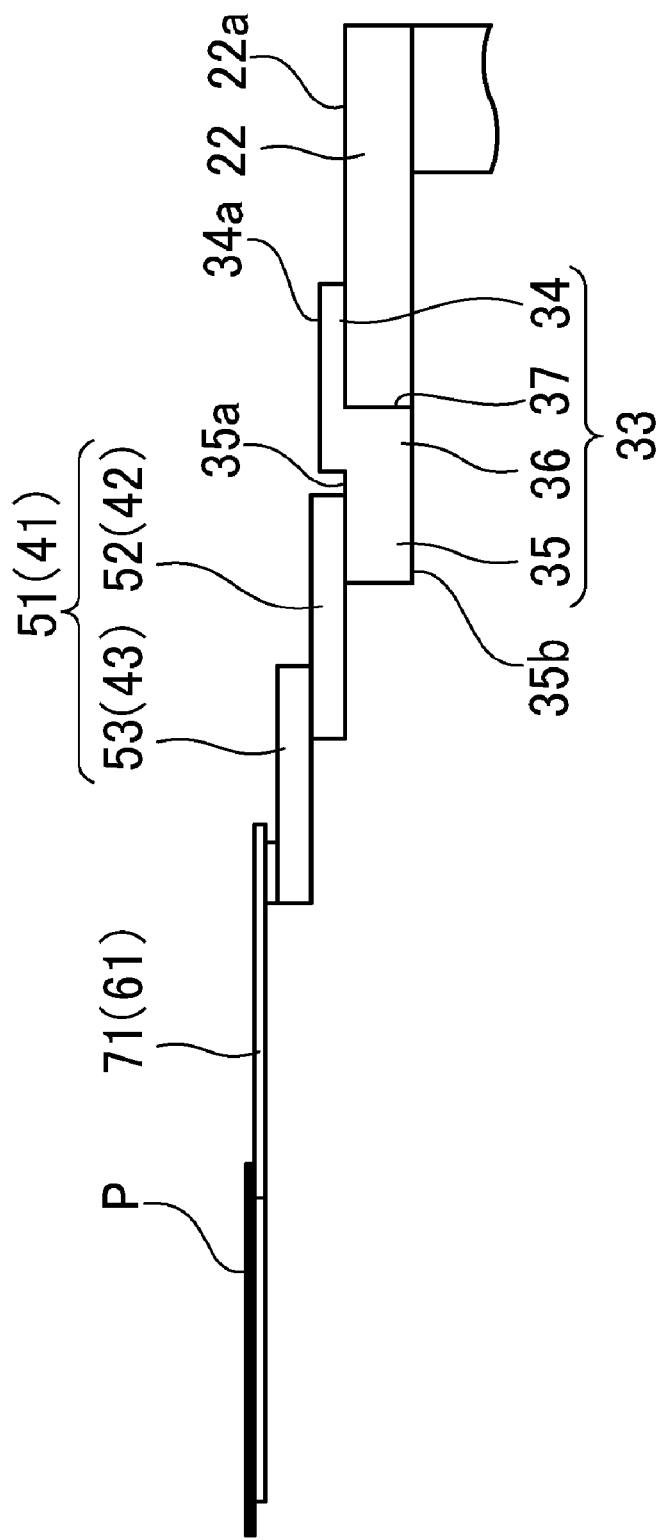
FIG. 6 is a side view showing a loading/unloading robot according to a second embodiment of the present invention.

In the same way as the loading/unloading robot 10 according to the first embodiment, a loading/unloading robot 11 according to the present embodiment includes the support unit 20 installed so as to be capable of being raised and lowered, the arm unit 40 that is attached to the support unit 20, and the hand unit 60 that is attached to the arm unit 40, but differs to the loading/unloading robot 10 according to the first embodiment in the construction of the head portion (see FIG. 6). Since the remaining construction is the same as the loading/unloading robot 10 according to the first embodiment, detailed description of the head portion is omitted here. Constructions that are the same have been assigned the same reference numerals and description thereof is omitted.

As shown in FIG. 6, a head portion 33 of the loading/unloading robot 11 according to the present embodiment includes a base-end portion 34 rotatably supported on the base portion 22, a front portion 35 that rotatably supports the first arms 42, 52 of the arm unit 40, and a stepped portion 36 that integrally joins the base-end portion 34 and the front portion 35.

The base-end portion 34 of the head portion 33 is supported on the base portion 22 in a state so as to be rotatable around the second rotational axis a2. A head portion installation surface 22a of the base portion 22 that supports the head portion 33 is provided on the upper surface of a front portion of the base portion 22.

On the other hand, base-end portions 42a, 52a of the first arms 42, 52 of the left and right arms 41, 51 are attached so as to be rotatable around the axes of rotation a3. An arm installation surface 35a that supports base-end portions of the left and right arms 42, 52 is provided on the upper surface of the front portion 35 of the head portion 33. Although the height of the arm installation surface 35a of the head portion 33 may be flush with or higher than the height of the upper surface of the base portion 22, the arm installation surface 35a should preferably be lower than the upper surface of the base portion 22.

The upper surface (arm installation surface) 35a of the front portion 35 of the head portion 33 is positioned lower than the upper surface of the head base-end portion 34 and the height of a lower surface 35b of the head front portion 35 is positioned lower than the head portion installation surface 22a.

By using this construction, the position in the height direction of the first arms 42, 52 of the arm unit 40 is set low and the positions in the height direction of the hands 61, 71 attached to the front ends of the left and right arms 41, 51 can be set lower. By doing so, it is possible to miniaturize (and especially make lower) the loading/unloading robot 11, which makes it possible to suppress the overall height of the loading/unloading robot 11. As a result, in cases where the loading/unloading robot 11 is disposed inside a vacuum chamber or an EFEM (Equipment Front End Module) for example, it is possible to reduce the volume of the chamber or the EFEM, which makes it possible to reduce the processing time at the start of the process and to shorten the restoration time during maintenance and the like.

Figure 7:
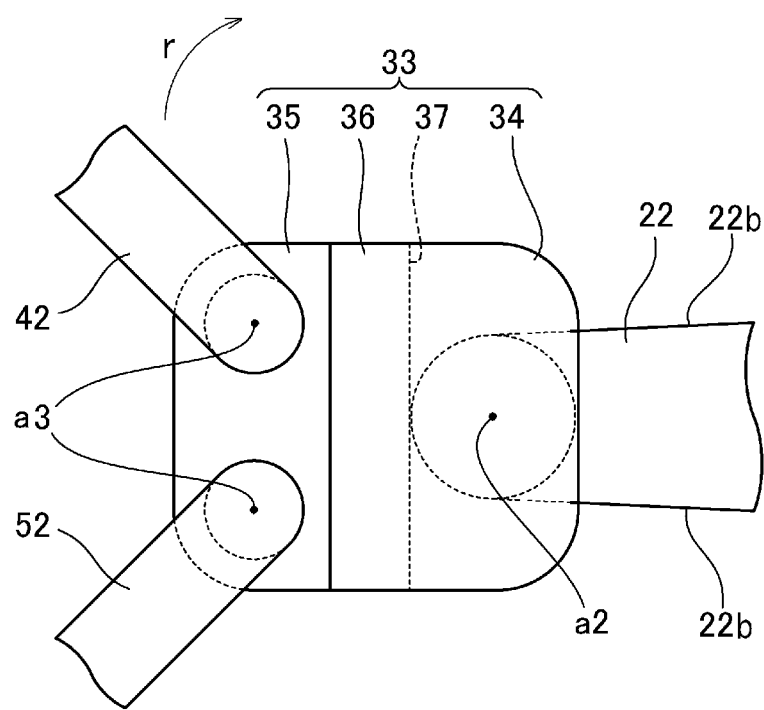
FIG. 7 is a plan view showing a head portion of the loading/unloading robot shown in FIG. 6.

In addition, as shown in FIG. 7, the head portion 33 according to the present embodiment includes a rotation restricting member 37 that restricts the range of rotation of the head portion 33. Accordingly, if the head portion 33 rotates in the clockwise direction r, for example, the rotation restricting member 37 on the right side (the upper side in FIG. 7) of the head portion 23 strikes a side surface 22b of the base portion 22, thereby restricting rotation of the head portion 33. By providing such rotation restricting member 37, the rotatable range of the head portion 33 in the present embodiment is set at a range of around ±90° (in reality, 87°) based on a line that joins the raising/lowering axis a1 of the base portion 22 and the second rotational axis a2. The range of rotation of the head portion 33 can be arbitrarily set in a range of 0° to 90° according to the shape of the rotation restricting member 37 and/or the shape of the side surface 22b of the base portion 22.

Note that the loading/unloading robot according to the present invention is not limited to the robots in the above embodiments. The present invention further includes loading/unloading robots that have been modified without departing from the scope of the present invention as defined in the patent claims.

For example, although the hand unit 60 is moved back and forth by the multi-jointed arms 41, 51 that are freely capable of bending and extending, it is also possible to move the hand unit 60 using a slide mechanism realized using a slider or the like.

Also, although the intersection separation distance L5 (see FIG. 4A) matches the center distance L1 (see FIG. 3B) from the vertical axis a1 of the base portion 22 to the second rotational axis a2 in the first embodiment, the intersection separation distance L5 may be shorter than the center distance L1.

Although the revolution motor 81b of the base revolving mechanism 81 of the driving mechanism 80 is installed in the base portion 22 in the first embodiment described above, the revolution motor 81b may be installed in the pillar portion 21, and although the rotation motor 82b of the head rotating mechanism 82 is installed in the base portion 22, the rotation motor 82b may be installed in the head portion 23.

Also, although the rotation restricting member 37 of the head portion 33 is provided on the head portion 33 side in the loading/unloading robot 11 according to the second embodiment described above, a rotation restricting member may be provided on the base portion 22 side or rotation restricting members may be provided on both the base portion 22 and the head portion 23. The rotatable range of the head portion 33 may be a range of ±45° with respect to a segment that joins the raising/lowering axis a1 and the second rotational axis a2 of the base portion 22.

What is claimed is:

1. A loading/unloading robot comprising:
   a support unit installed so as to be capable of being raised and lowered;
   an arm unit attached to the support unit; and
   a hand unit for conveying an object to be loaded and unloaded, attached to the arm unit,
   wherein the support unit includes a base portion that can be revolved around a raising/lowering axis that extends in a raising/lowering direction and a head portion rotatably attached to the base portion,
   the arm unit includes an arm that is rotatably attached to the head portion,
   a front end of the arm moves forward and backward along a forward/backward direction that passes the head portion,
   the hand unit includes a loading/unloading hand rotatably attached to the front end of the arm,
   the head portion includes a base-end portion supported on an upper surface of the base portion that is a head portion installation surface, a front portion including an arm installation surface on which the arm is attached, and a stepped portion that integrally joins the base-end portion and the front portion,
   a height of an upper surface of the front portion that is the arm installation surface is lower than a height of an upper surface of the base-end portion, and
   a height of the arm installation surface is equal to or lower than a height of the upper surface of the base portion that is the head portion installation surface.

2. A loading/unloading robot according to claim 1, wherein at least one of the base portion and the head portion includes a rotation restricting member that restricts a range of rotation of the head portion.

3. A loading/unloading robot according to claim 2, wherein the rotation restricting member is included in the stepped portion of the head portion.

4. A loading/unloading robot according to claim 1, wherein the object to be loaded and unloaded is loaded into and unloaded from a loading/unloading destination where loading/unloading is possible by moving the object to be loaded and unloaded forward and backward, the base portion is a rotational axis positioning means that revolves to produce a state where the rotational axis of the head portion is positioned on a loading/unloading line that passes through a center of a predetermined loading/unloading destination,
   the arm moves a loading/unloading hand attached to a front end portion of the arm forward and backward in the forward/backward direction, and
   the head portion is a forward/backward direction deciding means that is operable when the rotational axis of the head portion has been positioned on the loading/unloading line, to rotate so that a forward/backward movement line, which is a movement path of the rotational axis of the loading/unloading hand, is positioned on the loading/unloading line.

5. A loading/unloading robot according to claim 4, wherein the support unit includes a controller that causes the base portion to revolve so that the rotational axis of the head portion is positioned on a loading/unloading line of a predetermined loading/unloading destination and is operable in a state where the rotational axis of the head portion has been positioned on the loading/unloading line, to cause the head portion to revolve so that the forward/backward movement line of the loading/unloading hand is positioned on the loading/unloading line.

6. A loading/unloading robot according to claim 5, wherein the loading/unloading robot loads and unloads the object to be loaded and unloaded into or from one out of a plurality of loading/unloading destinations disposed so that the loading/unloading lines pass through a range of revolution of a rotational axis position of the base portion.

7. A loading/unloading robot according to claim 6, wherein the loading/unloading robot loads and unloads the object to be loaded and unloaded into or from one out of a plurality of loading/unloading destinations disposed so that there is at least one intersection where the loading/unloading lines intersect one another and each intersection is a position inside the range of revolution.

* * * * *